(12) United States Patent
Kim et al.

(10) Patent No.: US 12,049,688 B2
(45) Date of Patent: Jul. 30, 2024

(54) AUSTENITIC STAINLESS STEEL HAVING EXCELLENT ELECTRICAL CONDUCTIVITY, AND METHOD FOR MANUFACTURING SAME

(71) Applicant: POSCO, Pohang-si (KR)

(72) Inventors: Kwang-Min Kim, Pohang-si (KR); Mi-Nam Park, Pohang-si (KR); Bo-Sung Seo, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 717 days.

(21) Appl. No.: 17/259,288

(22) PCT Filed: Jun. 14, 2019

(86) PCT No.: PCT/KR2019/007244
§ 371 (c)(1),
(2) Date: Jan. 11, 2021

(87) PCT Pub. No.: WO2020/251103
PCT Pub. Date: Dec. 17, 2020

(65) Prior Publication Data
US 2021/0254203 A1    Aug. 19, 2021

(51) Int. Cl.
*C22C 38/58* (2006.01)
*C21D 1/26* (2006.01)
(Continued)

(52) U.S. Cl.
CPC ............... *C22C 38/58* (2013.01); *C21D 1/26* (2013.01); *C22C 38/02* (2013.01); *C22C 38/42* (2013.01);
(Continued)

(58) Field of Classification Search
None
See application file for complete search history.

(56) References Cited

U.S. PATENT DOCUMENTS

2003/0116536 A1    6/2003    Ohtani et al.

FOREIGN PATENT DOCUMENTS

| EP | 1046723 A1 | 10/2000 |
|---|---|---|
| JP | H08-060302 A | 3/1996 |

(Continued)

OTHER PUBLICATIONS

Japanese Office Action dated Jul. 19, 2022 issued in Japanese Patent Application No. 2021-500799 (with English translation).

(Continued)

*Primary Examiner* — Anthony M Liang
(74) *Attorney, Agent, or Firm* — Morgan, Lewis & Bockius LLP

(57) ABSTRACT

The present disclosure relates to austenitic stainless steel with excellent electrical conductivity in which metal copper is formed in a non-conductive passivation film formed on the surface of stainless steel, and a method of manufacturing the same.

The austenitic stainless steel with excellent electrical conductivity according to an embodiment of present disclosure includes: a stainless steel base material comprising, in percent (%) by weight of the entire composition, C: 0.1% or less, Si: 0.1 to 1.0% or less, Mn: 0.1 to 2.0% or less, Cr: 15 to 24% or less, Ni: 6 to 12% or less, Cu: 0.5 to 3% or less, the remainder of iron (Fe) and other inevitable impurities; and a passivation film formed on the stainless steel base material, and the passivation film has a thickness of more than 0 and less than or equal to 5 nm, the Cu weight % content in the thickness region between 2 to 3 nm from the surface of the passivation film is 1.5 or more compared to the Cu weight % content of the stainless steel base material.

4 Claims, 4 Drawing Sheets

(51) Int. Cl.
  *C22C 38/02*   (2006.01)
  *C22C 38/42*   (2006.01)
  *C22C 38/52*   (2006.01)
  *C23C 22/34*   (2006.01)

(52) U.S. Cl.
  CPC ........ *C23C 22/34* (2013.01); *C21D 2211/001* (2013.01)

(56) References Cited

FOREIGN PATENT DOCUMENTS

| | | | | |
|---|---|---|---|---|
| JP | 2003-297379 | A | | 10/2003 |
| JP | 2004-2960 | A | | 1/2004 |
| JP | 2004-002960 | A | | 1/2004 |
| JP | 2004002960 | A | * | 1/2004 |
| JP | 2007-27032 | A | | 2/2007 |
| JP | 2007-027032 | A | | 2/2007 |
| KR | 10-2017-0101528 | A | | 9/2017 |
| KR | 10-2019-0140661 | A | | 12/2019 |
| WO | 02/38828 | A1 | | 5/2002 |
| WO | 02/39530 | A1 | | 5/2002 |

OTHER PUBLICATIONS

Second Chinese Office Action dated May 25, 2022 issued in Chinese Patent Application No. 201980053906.0 (with English translation).
Extended European Search Report dated Aug. 6, 2021 issued in European Patent Application No. 19932299.1.
Chinese Office Action dated Oct. 22, 2021 issued in Chinese Patent Application No. 201980053906.0.
Japanese Office Action dated Sep. 19, 2023 issued in Japanese Patent Application No. 2021-500799 (with English translation).
Canadian Office Action dated Nov. 30, 2021 issued in Canadian Patent Application No. 3106377.
Japanese Office Action dated Jan. 11, 2022 issued in Japanese Patent Application No. 2021-500799 (with English translation).
Japanese Notice of Termination of Reconsideration by Examiner dated Feb. 3, 2023 issued in Japanese Patent Application No. 2021-500799 (with English translation).
Taiwanese Office Action dated Nov. 16, 2022 issued in Taiwanese Patent Application No. 11121042840 (Partial English translation).
International Search Report dated Mar. 5, 2020 issued in International Patent Application No. PCT/KR2019/007244 (with English translation).

* cited by examiner

【FIGURE 1】
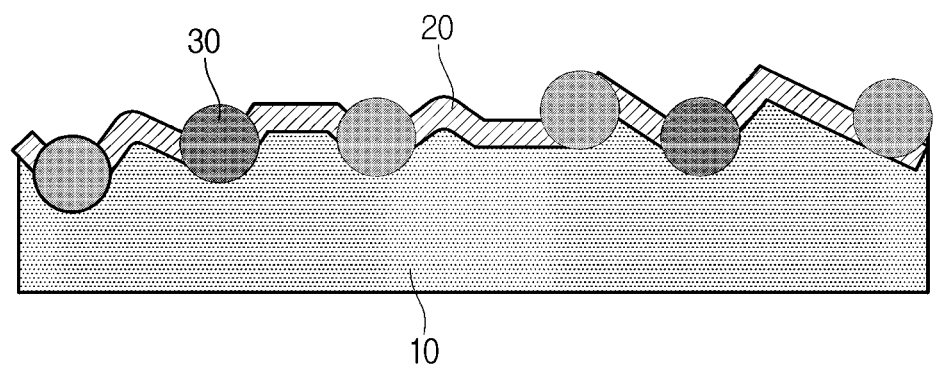

[FIGURE 2]
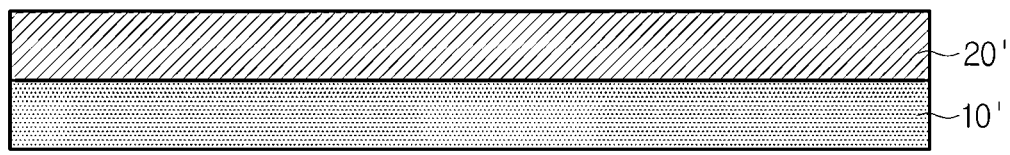

[FIGURE 3]
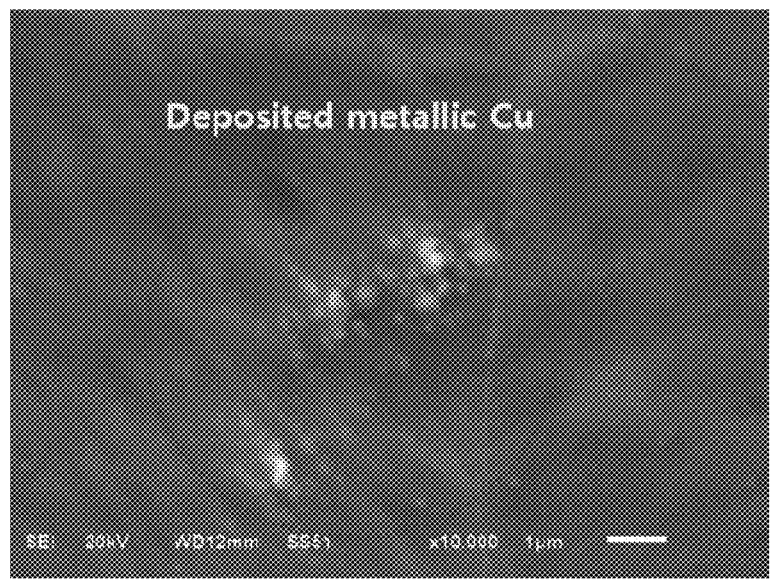

[FIGURE 4]
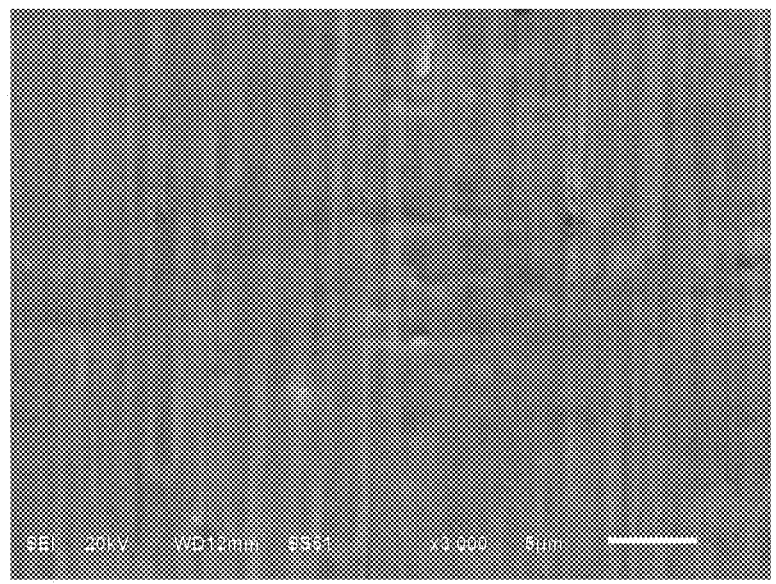

AUSTENITIC STAINLESS STEEL HAVING EXCELLENT ELECTRICAL CONDUCTIVITY, AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/007244, filed on Jun. 14, 2019, the entire disclosure of which application is incorporated by reference herein.

TECHNICAL FIELD

The present disclosure relates to austenitic stainless steel with excellent electrical conductivity and a method of manufacturing the same, and more specifically, austenitic stainless steel with excellent electrical conductivity in which metal copper is formed in a non-conductive passivation film formed on the surface of stainless steel, and a method of manufacturing the same.

BACKGROUND ART

Electrical contact is used in a wide variety of electronic products, and can be especially used on PCB boards of electronic products or mobile devices. The most important characteristic of electrical contact is electrical conductivity. Copper (Cu) and nickel (Ni) have excellent surface electrical conductivity, but ductile metals such as copper (Cu) or nickel (Ni) cannot be used alone for electrical contact that requires a certain level of hardness.

For this reason, stainless steel with relatively high hardness is used, and a stainless steel thin plate less than 0.3 mm thick is used for electrical contact purposes. These stainless steel thin plates are manufactured through cold rolling and bright annealing heat treatment processes. Stainless steel cold rolled coils with a thickness of less than 0.3 mm do not undergo annealing heat treatment in an oxidizing atmosphere to prevent surface defects such as indentation flaw and difficulty in controlling coil tension after cold rolling, and performs bright annealing heat treatment in a reducing atmosphere containing hydrogen and nitrogen of 70% or more to recrystallize and remove stress.

Since bright annealing heat treatment is performed in a reducing atmosphere, it is possible to manufacture a stainless steel plate with a passivation film of several nm thickness having a smooth surface state, not in the form of a high-temperature oxidation scale of several μm thick formed in a normal oxidizing atmosphere. Since the passivation film formed through the bright annealing process exhibits a high resistance value, it is important to remove the passivation film formed through the bright annealing process in order to use it as an electrical contact.

When the passivation film formed through the bright annealing process is removed and the stainless steel plate is exposed to the air, it combines with oxygen in the air to form a passivation film of nm thickness again. The passivation film formed in the air has a high Fe content and a thick thickness, so it is not suitable for use as an electrical contact. Therefore, it is difficult to use stainless steel alone for electrical contact without plating a conductive material, and in order to use it for electrical contact, a post-treatment process is required to improve the contact resistance and electrical conductivity of the surface between the stainless steel base material and the passivation film.

To solve this problem, stainless steel having high hardness is plated with a conductive metal such as gold (Au) or nickel (Ni), but the manufacturing cost and manufacturing time are increased due to the additional process for plating. There was a problem that mass production was difficult because plating had to be carried out individually.

Disclosure

Technical Problem

The present disclosure is intended to provide austenitic stainless steel with excellent electrical conductivity without a separate plating process.

In addition, the present disclosure intends to provide a method of manufacturing austenitic stainless steel with excellent electrical conductivity.

Technical Solution

In accordance with an aspect of the present disclosure, an austenitic stainless steel with excellent electrical conductivity includes: a stainless steel base material comprising, in percent (%) by weight of the entire composition, C: 0.1% or less, Si: 0.1 to 1.0% or less, Mn: 0.1 to 2.0% or less, Cr: 15 to 24% or less, Ni: 6 to 12% or less, Cu: 0.5 to 3% or less, the remainder of iron (Fe) and other inevitable impurities; and a passivation film formed on the stainless steel base material, and the passivation film has a thickness of more than 0 and less than or equal to 5 nm, the Cu weight % content in the thickness region between 2 to 3 nm from the surface of the passivation film is 1.5 or more compared to the Cu weight % content of the stainless steel base material.

The passivation film may be formed of an oxide containing Fe, Cr, Ni.

The contact resistance of the stainless steel may be 15 mψcm$^2$ or less.

The surface roughness of the stainless steel may be 1.13 μm or less.

In accordance with another aspect of the present disclosure, a method of manufacturing an austenitic stainless steel with excellent electrical conductivity includes: forming a passivation film by bright annealing the stainless steel base material comprising, in percent (%) by weight of the entire composition, C: 0.1% or less, Si: 0.1 to 1.0% or less, Mn: 0.1 to 2.0% or less, Cr: 15 to 24% or less, Ni: 6 to 12% or less, Cu: 0.5 to 3% or less, the remainder of iron (Fe) and other inevitable impurities; and modifying the surface of the stainless steel base material forming a metal copper in the passivation film by immersing in an acid solution.

The surface of the stainless steel base material may be immersing in a hydrochloric acid solution of 10 to 20% concentration.

The temperature of the hydrochloric acid solution may be 40 to 60° C.

The modifying the surface of the stainless steel base material may be immersing in a mixed acid solution containing hydrochloric acid of 10 to 20% concentration and hydrofluoric acid of 5 to 10% concentration.

The temperature of the mixed acid solution of the hydrochloric acid and the hydrofluoric acid may be 40 to 60° C.

Advantageous Effects

According to the austenitic stainless steel with excellent electrical conductivity and method of manufacturing the same according to the embodiment of the present disclosure, stainless steel having excellent electrical conductivity can be manufactured without a separate plating process. Accordingly, it is possible to reduce cost and improve productivity by simplifying the production process.

DESCRIPTION OF DRAWINGS

FIG. 1 is a cross-sectional view of austenitic stainless steel with excellent electrical conductivity according to an embodiment of the present disclosure.

FIG. 2 is a cross-sectional view of a conventional austenitic stainless steel.

FIG. 3 is a photograph of copper formed on a stainless surface of Inventive Example 8, an embodiment of the present disclosure using a scanning electron microscope (SEM).

FIG. 4 is a photograph of the stainless surface of Comparative Example 6 using a SEM.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a cross-sectional view of austenitic stainless steel with excellent electrical conductivity according to an embodiment of the present disclosure. FIG. 2 is a cross-sectional view of a conventional austenitic stainless steel.

As shown in FIG. 1, an austenitic stainless steel with excellent electrical conductivity according to an embodiment of the present disclosure includes a stainless steel base material 10 and a passivation film 20 formed on a stainless steel base material 10. In addition, it can be seen that the metal copper 30 is distributed in the passivation film 20.

According to the embodiment of the present disclosure, the stainless steel base material includes, in percent (%) by weight of the entire composition, C: 0.1% or less, Si: 0.1 to 1.0% or less, Mn: 0.1 to 2.0% or less, Cr: 15 to 24% or less, Ni: 6 to 12% or less, Cu: 0.5 to 3% or less, the remainder of iron (Fe) and other inevitable impurities.

Hereinafter, the roles and contents of each component included in the base material of austenitic stainless steel with excellent electrical conductivity according to the present disclosure will be described. The percentages for the following components mean weight percent.

The content of C (carbon) is 0.1% or less.

C is an austenite phase stabilizing element, and the more it is added, the more effective it is to stabilize the austenite phase. However, containing 0.1% or less of C inhibits the corrosion resistance of the layer lacking chromium (Cr). Accordingly, the range of C according to the embodiment of the present disclosure is limited to 0.1% or less.

The content of Si (silicon) is 0.1 to 1.0% or less.

Si is a component added as a deoxidizer in the steel making step, and when undergoing a bright annealing process, Si oxide can be formed in the passivation film to improve the corrosion resistance of the steel. However, when it contains 1.0% or more of Si, the ductility of the steel is reduced. Accordingly, the range of Si according to the embodiment of the present disclosure is limited to 0.1 to 1.0%.

The content of Mn (manganese) is 0.1 to 2.0% or less.

Mn is an austenite phase stabilizing element. Since the austenite phase is stabilized as more is added, it contains 0.1% or more. However, since excessive addition of Mn may impair corrosion resistance, it is appropriate to limit the upper limit to 2% or less. Accordingly, the range of Mn according to the embodiment of the present disclosure is limited to 0.1 to 2.0%.

The content of Cr (chromium) is 15 to 24% or less.

Cr is an essential element for corrosion resistance. In order to secure corrosion resistance in the atmosphere, 15% or more is added. However, Cr is a ferrite phase generating element. When Cr is excessively added, an excessive delta (O)-ferrite phase remains, which deteriorates hot workability. Therefore, it is appropriate to limit the upper limit to 24%. Accordingly, the range of Cr according to the embodiment of the present disclosure is limited to 15 to 24%.

The content of Ni (nickel) is 6 to 12% or less.

Ni is an essential element as an austenite phase stabilizing element. When surface modification, it is easy to form conductive passivation film by suppressing extreme dissolution of stainless steel base material, so add 6% or more. However, excessive addition of expensive Ni has a problem that the cost is increased, and the upper limit is limited to 12%. Accordingly, the Ni content according to the embodiment of the present disclosure is limited to 6 to 12%.

The content of Cu (copper) is 0.5 to 3.0% or less.

Cu is an element that improves corrosion resistance and elongation. If the content of Cu is 0.5% or less, the natural potential of stainless is high in the generation of the passivation film, which will be described later, or the concentration of $Cu^{2+}$ to be reduced to metal copper is insufficient, so that the metal copper may not be generated, which may increase the contact resistance. The minimum content should be 0.5%. However, if Cu is excessively added, the hot workability is deteriorated, so the upper limit is limited to 3.0%. Accordingly, the Cu content according to the embodiment of the present disclosure is limited to 0.5 to 3.0%.

The austenitic stainless steel with excellent electrical conductivity according to the embodiment of the present disclosure includes the passivation film 20 formed on the stainless steel base material 10, and the passivation film 20 has a thickness t1 greater than 0 and 5 nm or less.

Since the thickness t1 of the passivation film 20 is thinned to be 5 nm or less, a passivation film having semiconductor characteristics close to normal insulation can be thinned to reduce contact resistance.

In addition, the Cu weight % content in the thickness region between 2 to 3 nm from the surface of the passivation film 20 may be 1.5 or more compared to the Cu weight % content of the stainless steel base material 10. Cu located in the thickness region between 2 to 3 nm from the surface of the passivation film 20 is formed by reducing $Cu^+$ dissolved in the stainless steel base material in the surface modification step. Since the passivation film is not formed at the location where Cu is formed, and Cu can maintain a state in direct contact with the stainless steel base material 10, Cu becomes a path for electron movement, so that the contact resistance of the passivation film can be low. Accordingly, it is possible to secure excellent electrical conductivity.

In addition, the passivation film 20 may be formed of an oxide containing Fe and Cr Ni.

In addition, the contact resistance of stainless steel may be 15 mψcm² or less. Contact resistance is the sum of the contact resistance that occurs on the contact surface of the passivation film 20 of stainless steel when the stainless steel contacts another object and the contact resistance of the passivation film 20 itself. According to the embodiment of the present disclosure, since Cu becomes a path for electron movement, electrons do not move to the passivation film 20, but electrons move to the stainless steel base material 10, thereby reducing contact resistance. Accordingly, it is possible to secure excellent electrical conductivity.

In addition, the surface roughness of stainless may be 1.13 μm or less. When the surface roughness increases, the contact resistance increases. Therefore, the upper limit is set to 1.13 μm.

Hereinafter, a process of manufacturing austenitic stainless steel with excellent electrical conductivity according to an embodiment of the present disclosure will be described.

The method of manufacturing austenitic stainless steel with excellent electrical conductivity according to the embodiment of the present disclosure includes a forming a first passivation film by bright annealing the stainless steel base material comprising, in percent (%) by weight of the entire composition, C: 0.1% or less, Si: 0.1 to 1.0% or less, Mn: 0.1 to 2.0% or less, Cr: 15 to 24% or less, Ni: 6 to 12% or less, Cu: 0.5 to 3% or less, the remainder of iron (Fe) and other inevitable impurities, and a modifying the surface of the stainless steel base material removing the first passivation film and forming a second passivation film by immersing in an acid solution.

The explanation of the reason for limiting the numerical value of the alloy component content is as described above.

The stainless steel cast plate having the above alloy composition is subjected to hot rolling, annealing, pickling, cold rolling, and bright annealing processes to manufacture a stainless steel cold rolled thin plate. In the cold rolling step, the stainless steel thin plate having the above-described alloy component content is rolled using a Z-mill cold rolling mill, and in the subsequent heat treatment step, the cold rolled thin plate is subjected to bright annealing heat treatment to form a first passivation film on the surface of the cold rolled thin plate.

Bright annealing heat treatment means performing annealing in an oxidizing-free atmosphere. For coils of 0.3 mm or less thick, bright annealing heat treatment is performed in a reducing atmosphere containing hydrogen and nitrogen to prevent difficulty in controlling coil tension and surface defects. In this case, it is appropriate that the hydrogen content is 70% or more.

Since the bright annealing heat treatment is performed in a reducing atmosphere, a passivation film having a smooth surface state of several nm thickness can be formed, and Cr—Fe oxide, Mn oxide, Si oxide, etc. can be formed in the passivation film.

A cold rolled thin plate that has undergone a bright annealing heat treatment process increases interfacial contact resistance by a passivation film of several nm thickness formed on its surface.

Therefore, in order to use the bright annealed stainless steel thin plate for electrical contact, it is necessary to remove the non-conductive passivation film on the surface of the stainless steel thin plate. However, it is difficult to completely remove the passivation film due to the characteristics of the passivation film, and if exposed to the air after removing the passivation film, a non-conductive oxide film with a thickness of several nm is formed again due to the influence of oxygen in the air, so it cannot have excellent electrical conductivity. Therefore, according to the embodiment of the present disclosure, even if there is a non-conductive passivation film, a conductive material is partially generated in the passivation film to ensure excellent electrical conductivity. According to the embodiment of the present disclosure, by forming a metal copper with excellent conductivity locally in the passivation film, austenitic stainless steel with excellent electrical conductivity is manufactured without plating a conductive material separately.

It includes the step of modifying the surface of the stainless steel base material by immersing in an acid solution to form a metal copper in the passivation film.

As the acid solution, a hydrochloric acid (HCl) solution having a concentration of 10 to 20% may be used. The temperature of the hydrochloric acid solution may be 40 to 60° ° C.

In addition, as the acid solution, a mixed acid solution including hydrochloric acid (HCl) at a concentration of 10 to 20% and hydrofluoric acid (HF) at a concentration of 5 to 10% may be used. In this case, the temperature of the mixed acid solution may be 40 to 60° C.

When stainless steel is immersed in the acid solution, the passivation film on the surface of the stainless steel base material is partially removed. When the passivation film is removed, the stainless steel base material is exposed to the acid solution, causing the base material to dissolve. Accordingly, metal ions such as $Fe^{2+}$ $Cr^{3+}$, $Ni^{2+}$, $Cu^{2+}$ in the base material exist in the solution. Since the stainless steel base material is exposed to the acid solution, the natural potential of the stainless steel base material is lowered, and Cu has a high reduction potential, $Cu^{2+}$ ions are reduced to metal copper. At this time, the passivation film is not regenerated because the stainless steel base material has no contact with air in the acid solution. In addition, even if the non-conductive passivation film is regenerated by contact with air after $Cu^{2+}$ ions are reduced to metal copper, the passivation film is not generated at the location where the metal copper is generated. In addition, since metal copper can maintain direct contact with the stainless steel base material, metal copper can be a path for electron transfer.

If the concentration of hydrochloric acid (HCl) is too low, the natural potential of the stainless steel base material is higher than the reduction potential of copper, so the reduction of metal copper does not occur and the effect of reducing contact resistance is reduced. Conversely, if the concentration of hydrochloric acid is too high, the effect of reducing contact resistance by metal copper on the stainless steel surface may be saturated. In addition, the effect of reducing contact resistance may be reduced due to severe erosion of the stainless steel base material. Accordingly, according to the embodiment of the present disclosure, the concentration of the hydrochloric acid solution may be limited to 10 to 20%.

Hydrofluoric acid (HF) helps remove the passivation film and lowers the natural potential of stainless than the reduction potential of copper so that metal copper can be formed. However, if the concentration of hydrofluoric acid is too low, the immersion time for hydrochloric acid is prolonged, so the metal copper generation efficiency is low, and the effect of reducing contact resistance may be reduced. On the contrary, if the concentration of hydrofluoric acid is too large, the erosion of the stainless steel base material becomes severe. Accordingly, according to the embodiment of the present disclosure, the concentration of the hydrofluoric acid solution may be limited to 5 to 10%.

The temperature of the acid solution used for surface modification to form the metal copper may be 40 to 60° C.

If the temperature of the acid solution is less than 40° C., the natural potential of the stainless steel base material is high, making it difficult to generate metal copper, which reduces the reduction of the contact resistance. On the contrary, when the temperature of the acid solution exceeds 60° C., the stainless steel base material is severely eroded and the reduction of the contact resistance decreases. Accordingly, according to the embodiment of the present disclosure, the temperature of the acid solution may be limited to 40 to 60° C.

The stainless steel manufactured according to this embodiment of the present disclosure includes a stainless steel base material and a passivation film formed on the stainless steel base material. Due to the metal copper formed in the passivation film, the contact resistance of stainless steel may be 15 mψcm². By reducing the contact resistance in this way, it is possible to manufacture stainless steel with excellent electrical conductivity.

The present disclosure is more specifically implemented through the following examples, but the examples are for illustrative and detailed description of the present disclosure, and the scope of the present disclosure is not limited to these examples.

Inventive Steel and Comparative Steel

After cold rolling austenitic stainless steel containing the component contents shown in the following [Table 1] through a Z-mill cold rolling mill, a cold rolled thin plate having a thickness of 0.1 mm was prepared by performing bright annealing heat treatment in a reducing atmosphere containing hydrogen (75 vol %) and nitrogen (25 vol %).

TABLE 1

| | Alloy composition | | | | | |
|---|---|---|---|---|---|---|
| | C | Si | Mn | Cr | Ni | Cu |
| Inventive Steel 1 | 0.04 | 0.4 | 0.7 | 17.8 | 8.3 | 0.8 |
| Inventive Steel 2 | 0.03 | 0.5 | 0.8 | 18.1 | 7.9 | 1.3 |
| Inventive Steel 3 | 0.05 | 0.4 | 1.4 | 20.2 | 11.1 | 2.9 |
| Inventive Steel 4 | 0.05 | 0.3 | 0.6 | 15.6 | 11.3 | 0.9 |
| Comparative Steel 1 | 0.03 | 0.4 | 1.0 | 17.5 | 7.9 | 0.2 |
| Comparative Steel 2 | 0.04 | 0.5 | 1.0 | 14.1 | 7.8 | 1.2 |

The cold-rolled thin plates of Inventive Steel and Comparative Steel described in [Table 1] were subjected to surface modification according to the conditions of [Table 2].

TABLE 2

| | Surface modification step | | | |
|---|---|---|---|---|
| | steel type | acid solution | concentration | Immersion time (minute) |
| Inventive Example1 | Inventive Steel1 | hydrochloric acid | 10% | 5 |
| Inventive Example2 | Inventive Steel1 | hydrochloric acid | 10% | 10 |
| Inventive Example3 | Inventive Steel1 | hydrochloric acid | 15% | 5 |
| Inventive Example4 | Inventive Steel1 | hydrochloric acid | 15% | 10 |
| Inventive Example5 | Inventive Steel1 | hydrochloric acid | 15% | 5 |
| | | hydrofluoric acid | 5% | |
| Inventive Example6 | Inventive Steel1 | hydrochloric acid | 15% | 10 |
| | | hydrofluoric acid | 5% | |
| Inventive Example7 | Inventive Steel2 | hydrochloric acid | 15% | 10 |
| Inventive Example8 | Inventive Steel2 | hydrochloric acid | 15% | 5 |
| | | hydrofluoric acid | 5% | |
| Inventive Example9 | Inventive Steel3 | hydrochloric acid | 15% | 10 |
| Inventive Example10 | Inventive Steel3 | hydrochloric acid | 15% | 5 |
| | | hydrofluoric acid | 5% | |
| Inventive Example11 | Inventive Steel4 | hydrochloric acid | 15% | 10 |
| Inventive Example12 | Inventive Steel4 | hydrochloric acid | 15% | 5 |
| | | hydrofluoric acid | 5% | |
| Comparative Example1 | Inventive Steel1 | hydrochloric acid | 5% | 10 |
| Comparative Example2 | Inventive Steel2 | hydrochloric acid | 5% | 5 |
| | | hydrofluoric acid | 3% | |
| Comparative Example3 | Comparative Steel1 | hydrochloric acid | 10% | 10 |
| Comparative Example4 | Comparative Steel1 | hydrochloric acid | 15% | 10 |
| Comparative Example5 | Comparative Steel1 | hydrochloric acid | 15% | 10 |
| | | hydrofluoric acid | 5% | |
| Comparative Example6 | Inventive Steel1 | — | — | — |
| Comparative Example7 | Comparative Steel2 | hydrochloric acid | 15% | 10 |
| | | hydrofluoric acid | 5% | |

[Table 3] is a table showing the thickness of the passivation film, the ratio of the Cu content in the thickness region between 2 to 3 nm from the surface of the passivation film and the Cu content in the stainless steel base material, surface roughness, and contact resistance.

TABLE 3

| | Passivation film thickness (nm) | ratio of Cu content in the thickness region between 2 to 3 nm from the surface of the passivation film/Cu content in the stainless steel base material | surface roughness (µm) | contact resistance (mΩcm²) |
|---|---|---|---|---|
| Inventive Example1 | 2.8 | 1.5 | 0.48 | 13.8 |

TABLE 3-continued

| | Passivation film thickness (nm) | ratio of Cu content in the thickness region between 2 to 3 nm from the surface of the passivation film/Cu content in the stainless steel base material | surface roughness (μm) | contact resistance (mΩcm$^2$) |
|---|---|---|---|---|
| Inventive Example2 | 2.6 | 1.9 | 0.72 | 11.1 |
| Inventive Example3 | 3.1 | 2.0 | 0.67 | 10.9 |
| Inventive Example4 | 2.9 | 2.2 | 0.78 | 8.7 |
| Inventive Example5 | 2.6 | 2.4 | 0.83 | 7.2 |
| Inventive Example6 | 3.2 | 2.9 | 0.88 | 6.6 |
| Inventive Example7 | 2.7 | 2.5 | 0.79 | 6.2 |
| Inventive Example8 | 2.5 | 2.9 | 0.74 | 5.6 |
| Inventive Example9 | 2.6 | 4.6 | 0.23 | 8.4 |
| Inventive Example10 | 2.3 | 6.7 | 0.36 | 6.8 |
| Inventive Example11 | 2.5 | 3.6 | 1.05 | 13.2 |
| Inventive Example 12 | 2.9 | 4.0 | 1.13 | 14.7 |
| Comparative Example 1 | 2.9 | 0.7 | 0.12 | 35.6 |
| Comparative Example2 | 2.7 | 0.8 | 0.35 | 28.7 |
| Comparative Example3 | 2.9 | 0.1 | 0.70 | 23.4 |
| Comparative Example4 | 2,7 | 0.2 | 0.98 | 29.3 |
| Comparative Example5 | 2.8 | 0.1 | 1.15 | 42.6 |
| Comparative Example6 | 3.2 | 0.1 | 0.06 | 65.3 |
| Comparative Example7 | 2.7 | 3.1 | 1.33 | 20.4 |

Referring to [Table 1] to [Table 3], in Inventive Example 1 to Inventive Example 6, as the concentration of the acid solution increases or the immersion time increases, the dissolution of the stainless steel base material occurs more and the natural potential of the stainless decreases, making the formation of metal copper easier, but the surface roughness becomes rough. That is, as the concentration of the acid solution increases or the immersion time increases, it can be seen that the ratio of Cu content in the thickness region between 2 to 3 nm from the surface of the passivation film/Cu content in the stainless steel base material increases, and the surface roughness becomes rough. Accordingly, it can be confirmed that it has low contact resistance.

Also, through Inventive Example 9 and Inventive Example 10, it can be seen that the high Cu content in the stainless steel base material facilitates the formation of metal copper in the acid solution, reducing the contact resistance.

Also, in the case of Comparative Example 1 and Comparative Example 2, it can be seen that since the concentration of acid solution is low and the natural potential of stainless steel is high, the metal copper is generated less, so the ratio of Cu content in the thickness between 2 to 3 nm from the surface of the passivation film/Cu content in the base material is small and accordingly the contact resistance is increased.

In the case of Comparative Example 3 to Comparative Example 5, Since the Cu content in the stainless steel base material is less than 0.5% by weight, the concentration of $Cu^{2+}$ to be reduced to metal copper is insufficient, so that almost no metal copper is formed and the contact resistance is high.

In the case of Comparative Example 6, it can be confirmed that the contact resistance is high because surface modification is not performed.

In Comparative Example 7, the Cr content is 15% or less, and the corrosion resistance of stainless is insufficient due to the low Cr content. In this case, although the erosion of the stainless steel base material was severe and the ratio of metal copper on the surface was increased, the surface roughness increased significantly, and thus the contact resistance increased.

FIG. 3 is a photograph of copper formed on a stainless surface of Inventive Example 8, an embodiment of the present disclosure using a scanning electron microscope (SEM). FIG. 4 is a photograph of the stainless surface of Comparative Example 6 using a SEM.

As can be seen in FIG. 3, when surface modification according to the embodiment of the present disclosure is performed on stainless steel having a component content according to the embodiment of the present disclosure, it can be seen that metal copper is formed on the stainless surface. In the case of FIG. 4, it can be seen that metal copper is not formed on the stainless surface.

As above, the austenitic stainless steel with excellent electrical conductivity manufactured according to the embodiment of the present disclosure has low contact resistance of stainless steel due to the metal copper formed on the surface. Therefore, it is possible to manufacture austenitic stainless steel with excellent electrical conductivity without a separate plating process or post-treatment process.

As described above, although exemplary embodiments of the present disclosure have been described, the present disclosure is not limited thereto, and a person with ordinary knowledge in the relevant technical field may appreciate that various changes and modifications can be made without departing from the concept and scope of the following claims.

INDUSTRIAL APPLICABILITY

The austenitic stainless steel according to the embodiment of the present disclosure has improved electrical conductivity without a separate plating process, and thus can be applied to a fuel cell separator.

The invention claimed is:

1. An austenitic stainless steel comprising:
   a stainless steel base material comprising, in percent (%) by weight of the entire composition, C: 0.1% or less, Si: 0.1 to 1.0%, Mn: 0.1 to 2.0%, Cr: 15 to 24%, Ni: 6 to 12%, Cu: 0.5 to 3%, the remainder of iron (Fe) and inevitable impurities; and
   a passivation film formed on the stainless steel base material, and
   wherein the passivation film has a thickness of more than 0 and less than or equal to 5 nm,
   a ratio of a Cu weight % content in a thickness region between 2 to 3 nm from a surface of the passivation film compared to a Cu weight % content of the stainless steel base material is 1.5 or more.

2. The austenitic stainless steel of claim 1, wherein the passivation film is formed of an oxide containing Fe, Cr, or Ni.

3. The austenitic stainless steel of claim 2, wherein a contact resistance of the stainless steel is 15 mψcm² or less.

4. The austenitic stainless steel of claim 2, wherein a surface roughness of the stainless steel is 1.13 μm or less.

\* \* \* \* \*